April 4, 1967 G. H. H. DWYER 3,312,222
OBSTETRICAL CERVICAL DILATOR WITH ROTARY EXPANSIBLE ARMS
Filed Sept. 1, 1964 2 Sheets-Sheet 1
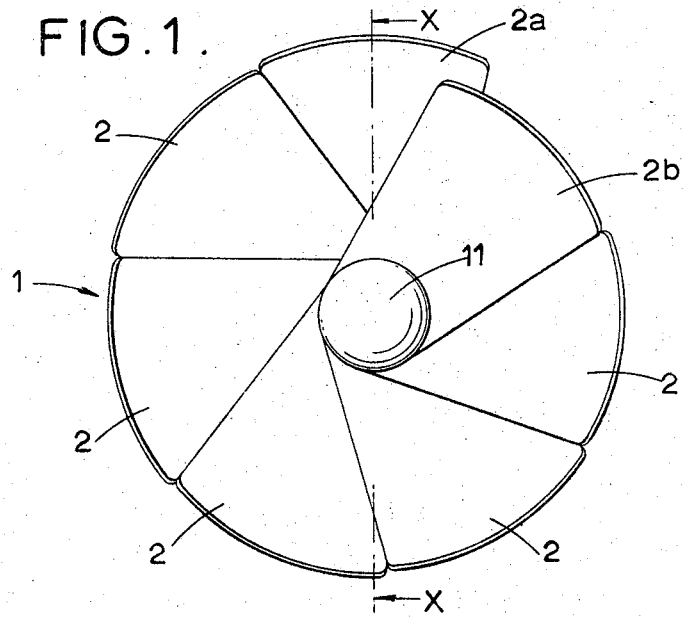
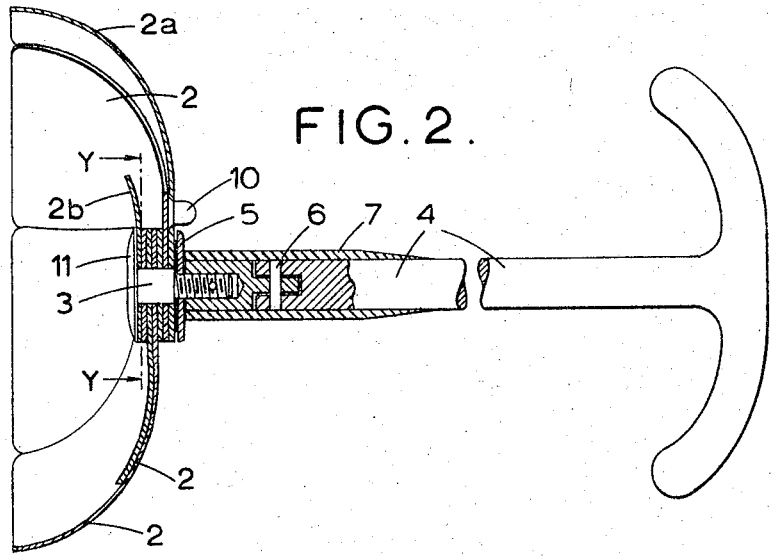
INVENTOR
Geoffrey Henry Hewlett Dwyer
BY
ATTORNEY 3,312,222
OBSTETRICAL CERVICAL DILATOR WITH
ROTARY, EXPANSIBLE ARMS
Geoffrey H. H. Dwyer, Altrincham, England, assignor to Allen and Hanburys (Surgical Instruments) Limited
Filed Sept. 1, 1964, Ser. No. 393,521
Claims priority, application Great Britain, Sept. 3, 1963, 34,713/63
4 Claims. (Cl. 128—345)

This invention relates to an obstetric instrument.

An object of the invention is to provide an instrument for stimulating uterine contractions and cervical dilatation, thus shortening the first stage of labor, and in certain cases for avoiding the necessity of performing the operation of Caesarean section.

According to the present invention, there is provided an obstetric instrument comprising a cup composed of a plurality of overlapping sections connected together so that they can be rotated fan-wise between a closed position in which they are superimposed on one another and an open position in which they co-operate to form the cup, and a handle which is rotatable to open and close the sections and to manipulate the cup when opened.

Figure 3:
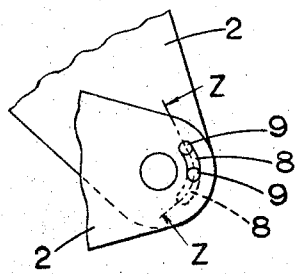
Figure 4:
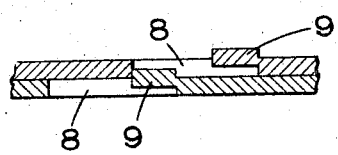
Figure 5:
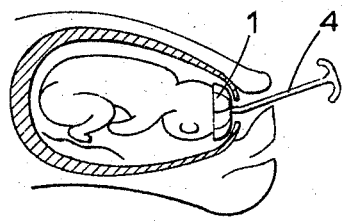

In the accompanying drawings;

FIGURE 1 is an end view of an obstetric instrument in accordance with the present invention, FIGURE 2 is a section on the line X—X of FIGURE 1, FIGURE 3 is a scrap view taken on the line Y—Y of FIGURE 2, FIGURE 4 is a section on the line Z—Z of FIGURE 3, and FIGURE 5 is a view illustrating the use of the instrument.

The instrument illustrated in the drawings comprises a cup generally designated by the reference 1 and composed of a plurality of separate sections 2 of similar size and shape. In the illustrated embodiment there are seven such sections 2, but there can be any convenient number of sections. The sections 2 can be made of metal such as stainless steel or of any other suitable material which can be sterilized and have rounded edges so as to avoid damage to surrounding tissues in the patient. The sections are arranged to pivot fan-wise on a central pivot pin 3 so that they can be moved between an operative or open position (as shown in FIGURES 1 and 2) in which they co-operate to form a shallow cup and a closed position in which they lie one on the other. Even when the sections 2 are in the open position, they overlap one another as shown in FIGURE 1.

The pivot pin 3 has a screw-threaded end which screws into a handle 4 which can also be of stainless steel or other suitable material. A washer 5 is arranged between the end of the handle 4 and the first section which is designated 2a. The handle 4 has a hinge 6 near the cup 1 to permit angulation of the handle if desired. A sleeve 7 of rubber or other suitable flexible material surrounds the portion of the handle 4 adjacent the cup.

The inner end of each section 2 (except the first one 2a) is provided with an arcuate slot 8 (shown in FIGURES 3 and 4) which receives a projection 9 of an adjacent section. The first section 2a also has a stud 10. The last section (designated 2b) is keyed to a head 11 of the pivot pin 3. If, therefore, the stud is held against movement and the handle 4 is rotated in one direction, the last section 2b will rotate and all the sections will rotate in turn owing to the engagement of the projections 9 and slots 8 until the cup is fully open. The cup is closed by rotating the handle in the opposite direction.

In use the cup is closed and the closed cup is inserted through the vagina and the uterine cervix of the patient into the lower segment of the uterus. The cup 1 is then opened (as shown in FIGURE 5) by rotating the handle 4 while the first section 2a of the cup is held against rotation by engaging a finger with the stud 10. The open cup 1 is then between the fetal head and the lower segment of the uterus and cervix. Traction is then exerted on the handle 4 by means of manual power or a weight. Uterine contractions are stimulated and cervical dilatation encouraged. The cup 1 may be closed by rotation of the handle 4 in the other direction to facilitate its removal.

What is claimed is:

1. An obstetric instrument comprising a pivot pin; a handle connected with said pin; and a shallow cup composed of a plurality of separate sections mounted on said pin and rotatable fan-wise between an open position in which they form said cup, said cup being of a size commensurate with the head of a fetus, and a closed position in which said sections are superimposed one on another and of a size whereby they can be inserted into the uterus of a patient, one of said sections being fixed to and rotatable with said pin and all of said sections except the one furthest from said fixed section being provided with arcuate slots, each of said slots being engaged with a projection of an adjacent section whereby rotation of said handle will open and close said cup.

2. An instrument as claimed in claim 1 further provided with a hinge in said handle; and a flexible sleeve surrounding the hinged portion of said handle.

3. An obstetric instrument comprising a pivot pin; a handle connected with said pin whereby rotation of said handle will rotate said pin; a hinge in said handle whereby angulation of said handle is permitted; a flexible sleeve surrounding the hinged portion of said handle; and a shallow cup comprising a plurality of sections mounted one on another on said pin, one of said sections being rotatable with said pin and all said sections being operatively connected together so that they can be moved fan-wise between an open position in which they co-operate to form said cup, said cup being of a size commensurate with the head of a fetus, and a closed position in which said sections can be inserted into the uterus of a patient; and an external stud on the one of said sections furthest from said fixed section whereby said one section can be held against rotation.

4. An obstetric instrument comprising a pivot pin; a handle connected with said pin so that rotation of said handle will cause rotation of said pin; a hinge in said handle to permit angulation thereof; a flexible sleeve surrounding the hinged portion of said handle; a first cup section fixed to said pin; a second cup section fitted on said pin; an external porjection on said second cup section to permit said second cup section to be held against rotation while said first cup section is being rotated; and a plurality of intermediate cup sections fitted on said pin between said first and second cup sections and operatively connected with said first and second cup sections whereby rotation of said handle will enable said sections to be moved fan-wise with respect to one another between an open position in which they co-operate to form a shallow cup, said cup being of a size commensurate with the head of a fetus, and a closed position in which said sections are superimposed on one another so that they can be inserted in the uterus of a patient.

References Cited by the Examiner

UNITED STATES PATENTS

| 322,198 | 7/1885 | Poynor | 128—352 |
|---|---|---|---|
| 1,244,751 | 10/1917 | McCleary | 128—345 |

FOREIGN PATENTS

| 325,846 | 2/1903 | France. |
|---|---|---|
| 3,301 | 1879 | Great Britain. |

RICHARD A. GAUDET, *Primary Examiner.*

D. L. TRULUCK, *Assistant Examiner.*